United States Patent [19]

Tsujikawa et al.

[11] Patent Number: 4,603,163

[45] Date of Patent: Jul. 29, 1986

[54] RESIN COMPOSITION CONTAINING A SAPONIFIED ETHYLENE-VINYL ACETATE COPOLYMER

[75] Inventors: Yozaburo Tsujikawa; Yoshinobu Okazaki; Takeo Tasaka, all of Tokushima, Japan

[73] Assignee: Otsuka Kagaku Kabushiki Kaisha, Osaka, Japan

[21] Appl. No.: 674,793

[22] Filed: Nov. 26, 1984

[51] Int. Cl.$^4$ .................................................. C08K 3/10
[52] U.S. Cl. ................................................... 524/413
[58] Field of Search ...................... 524/413; 106/299; 525/330.6

[56] References Cited

U.S. PATENT DOCUMENTS

| | | | |
|---|---|---|---|
| 3,830,777 | 8/1974 | Burton | 524/413 |
| 4,367,305 | 1/1983 | Satoh et al. | 524/413 |
| 4,377,650 | 3/1983 | Fischer | 524/413 |

*Primary Examiner*—Paul R. Michl
*Assistant Examiner*—Alex H. Walker
*Attorney, Agent, or Firm*—Armstrong, Nikaido, Marmelstein & Kubovcik

[57] ABSTRACT

A resin composition which comprises 50 to 95% by weight of a saponified ethylene-vinyl acetate copolymer and 5 to 50% by weight of potassium titanate fiber, the saponified copolymer being 10 to 55 mole % in ethylene content and at least 90 mole % in saponification degree of vinyl acetate portion.

4 Claims, No Drawings

RESIN COMPOSITION CONTAINING A SAPONIFIED ETHYLENE-VINYL ACETATE COPOLYMER

The invention relates to a resin composition containing a saponified ethylene-vinyl acetate copolymer which gives a molded product having an excellent property.

The saponified ethylene-vinyl acetate copolymer (hereinafter referred to as "EVA copolymer") is excellent in mechanical strength, non-charging property, resistances to oil and solvent, resistance to abrasion, etc, and is gradually used for preparing mechanical parts, structural parts and the like. Particularly, a molded product obtained from the saponified EVA copolymer incorporated glass fiber therein exhibits an improvement in tensile strength, tensile modulus, bending strength, bending modulus, compression strength and like mechanical properties. Thus, the above saponified copolymer containing 25 to 55% (% by weight, same in hereinafter) of glass fiber is sold and used as a material for molding.

However, a molded product of the saponified EVA copolymer containing glass fiber has a drawback that glass fiber comes to the surface to deteriorate the surface-smoothness of the molded product. Further, the molded product is poor in appearance due to a slight yellow of the resin.

In addition, though the above resin composition is excellent in mechanical strength and modulus, glass fiber is large in an average fiber diameter of 3 to 13 μm and an average fiber length of at least 3 mm. Thus, it is very difficult to mold the resin composition into small, thin-wall or fine parts such as those in precision machines, business machines, electric products for use at home, etc.

An object of the invention is to provide a resin composition which can be molded into parts having a very good appearance due to an excellent surface-smoothness and whiteness.

Another object of the invention is to provide a resin composition which can be molded into small, thin-wall or fine parts.

Still another object of the invention is to provide a resin composition which gives a molded product having an excellent mechanical property.

The above and other objects of the invention will be apparent from the following description.

The present invention provides a resin composition which comprises 50 to 95% by weight of a saponified ethylene-vinyl acetate copolymer and 5 to 50% by weight of potassium titanate fiber, the saponified copolymer being 10 to 55 mole % in ethylene content and at least 90 mole % in saponification degree of vinyl acetate portion.

The resin composition of the invention can be molded into parts having a very good appearance due to an excellent surface-smoothness and whiteness. The molded product of the invention is high in mechanical strength and particularly excellent in modulus despite of shorter fiber length of potassium titanate fiber. Further, the resin composition of the invention can be molded into small, thin-wall or fine parts. It is easy to design a mold and to shape the resin composition into minute parts due to a smaller orientation of potassium titanate fiber compared with glass fiber and carbon fiber.

The saponified EVA copolymer used in the invention has an ethylene content of 10 55 mole % and a saponification degree of vinyl acetate portion of at least 90 mole %. With more than 55 mole % in ethylene content, heat distortion temperature (HDT) of molded product is low. With less than 10 mole %, it is difficult to mold the composition due to the closeness of melting point and thermal decomposition temperature of the resin. Preferable ethylene content is 25 to 45 mole % from the viewpoint of moldability, mechanical property, HDT and the like. With less than 90 mole % in saponification degree, the molded product is low in thermal stability, HDT and mechanical property. Preferable saponification degree in vinyl acetate portion is at least 95 mole %.

The EVA copolymer may contain a small amount of a copolymerizable monomer other than ethylene, vinyl acetate (or vinyl alcohol derived from saponification of vinyl acetate). Examples of useful monomers are propylene, isobutylene and like olefins, acrylic acid, methacrylic acid, maleic acid, crotonic acid and like unsaturated acid or esters thereof, etc.

Potassium titanate fiber used in the invention is a single crystal represented by the formula

wherein l is an integer of 2 to 8. Examples thereof are potassium tetratitanate fiber, potassium hexatitanate fiber, potassium octatitanate fiber, etc., and these are used singly or in mixture. The titanate fiber has an average fiber diameter of preferably up to 2 μm, average fiber length of preferably 5 to 100 μm and a ratio of average fiber length to average fiber diameter (aspect ratio) of preferably 10 to 200.

In the invention, average fiber diameter and average fiber length of potassium titanate fiber are each average of values which were measured in at least 5 sights and at least 10 fibers in each sight, with use of a scanning-type electron microscope. An aspect ratio is a divisor of average fiber length by average fiber diameter.

With outside of the above ranges of average fiber diameter, average fiber length and aspect ratio, for example, more than 1 μm in average fiber diameter, less than 5 μm in average fiber length, namely when aspect ratio is less than 10, reinforcing effect of molded product is small, hence undesirable.

Further, fibers having an extremely small length of below 0.1 μm or having a long length of more than 100 μm are difficult to prepare industrially and have little practical use.

In general, potassium titanate fiber is added in an amount of 5 to 50%. With less than 5%, reinforcing effect is low. While, with more than 50%, molding is difficult due to high melt viscosity, hence undesirable.

Although potassium titanate fiber can be used as it is but is preferably surface-treated with silane coupling agent, titanate coupling agent, epoxy resin, epoxy-urethane resin and the like to improve an adhesiveness with the saponified EVA copolymer. Further, it is effective to add silane coupling agent and the like to a mixture of the saponified EVA copolymer and potassium titanate fiber in the process of preparing pellets.

The resin composition of the invention can be prepared by various methods, for example, 1. a method in which potassium titanate fiber is added to a system of polymerization of ethylene, vinyl acetate or like monomer, 2. a method in which potassium titanate fiber is added to the system in the middle of the polymerization, or to the system in the middle of the saponification, 3. a method in which potassium titanate fiber is added to the saponified EVA copolymer, the mixture was extruded by use of an extruder, cooled and then cut to prepare pellets, etc.

The third method is most practically employed.

To the resin composition of the invention may be added an additive such as a fire retardant, heat-stabilizer, ultraviolet ray absorbing agent, lubricant in a range without affecting the effects of the present invention.

The resin composition of the invention can be shaped by injection molding, extrusion, transfer molding and like methods having excellent productivity.

Since the resin composition of the invention has incorporated therein, as a reinforcing agent, potassium titanate fiber which is about 1/10 to 1/100 in size compared with conventional glass fiber or carbon fiber, the resin composition can be molded into a thin-wall parts by a simple method. The composition provides a molded product having a very good appearance due to the excellent surface-smoothness.

The molded product of the invention has the same mechanical strength as those reinforced with glass fiber, and has much excellent modulus because potassium titanate fiber is a single crystal and has a very high elasticity compared with glass fiber. Thus, the resin composition can be molded into small, thin-wall or fine parts and has an extremely wide use.

The invention will be described in more detail with reference to Examples but it is not intended that the invention be restricted by or to the examples.

Examples 1 to 4 and Comparison Examples 1 to 2

To a saponified EVA copolymer (ethylene content 27 mole %; saponification degree in vinyl acetate portion 99.0 mole %) was added potassium titanate fiber treated with epoxy-silane (average fiber diameter 0.3 μm, average fiber length 15 μm) in amounts as listed in Table 1. The mixture was weighed, mixed uniformly and then melted in an extruder (45 mm, single axis) at a temperature of 240° C. The molten mixture was cooled with water and made into pellets. The pellets were injection molded at an injection temperature of 240° C., mold temperature of 80° C. and injection pressure of 1000 kg/cm² to prepare a test specimens. A test specimens for comparison was prepared in the same manner as above except that glass fiber containing no alkali having an average fiber diameter of 13 μm and length of 3 mm (chopped strand treated with vinyl silane, filament number 400) was used in place of potassium titanate fiber. The following properties were measured with use of the specimens and the results were given in Table 1.

(Bending strength and bending modulus)

Measured according to JIS K7203 with use of a Test specimens 185±1 mm long by 10±0.5 mm wide by 4±0.2 mm height. Tests were repeated with 5 specimens. Support span: 60 mm, crosshead rate: 5 mm/min.

(Molding shrinkage, Hunter whiteness and surface smoothness)

Shrinkage in longitudinal and latitudinal directions was measured with a micrometer by use of three side-gate specimens 60 mm long by 50 mm wide by 3 mm height.

Hunter whiteness was measured with use of color and color-difference meter.

Surface smoothness was observed with the unaided eye.

TABLE 1

|  | Example |  |  |  | Com. Ex. |  |
|---|---|---|---|---|---|---|
|  | 1 | 2 | 3 | 4 | 1 | 2 |
| Saponified EVA copolymer (%) | 93 | 80 | 70 | 55 | 100 | 70 |
| Potassium titanate fiber (%) | 7 | 20 | 30 | 45 | — | — |
| Glass fiber (%) | — | — | — | — | — | 30 |
| Bending strength (kgf/cm²) | 1710 | 2280 | 2690 | 3340 | 1370 | 2570 |
| Bending modulus (kgf/cm²) | 66000 | 106000 | 139000 | 185000 | 42000 | 112000 |
| Shrinkage (%) |  |  |  |  |  |  |
| longitudinal | 0.52 | 0.25 | 0.17 | 0.15 | 0.95 | 0.15 |
| latitudinal | 0.53 | 0.27 | 0.20 | 0.18 | 0.96 | 0.28 |
| Hunter whiteness | 88 | 91 | 92 | 93 | 42 | 47 |
| Surface smoothness | Good | Good | Good | Good | Good | No good |

As apparent from Table 1, potassium titanate fiber extremely improves bending strength and bending modulus, though small in size compared with glass fiber, and exhibits a very excellent modulus. The composition of the invention is low in anisotropy of shrinkage in molding and gives a molded product having a very smooth and good appearance due to a large Hunter whiteness number.

Examples 5 to 7 and Comparison Examples 3 to 4

Five kinds of resin compositions were prepared in the same manner as in Examples 1 to 4 with the exception of using saponified EVA copolymer as listed in Table 2 and potassium titanate fiber (30%, same as in Examples 1 to 4). Test specimens were also prepared in the same manner as in Examples 1 to 4 with use of the above compositions and properties thereof were measured. The results were shown in Table 2.

TABLE 2

|  |  | Example |  |  | Com. Ex. |  |
|---|---|---|---|---|---|---|
|  |  | 5 | 6 | 7 | 3 | 4 |
| Saponified EVA copolymer | ethylene content (mole %) | 25.8 | 35.3 | 43.7 | 57.2 | 35.3 |
|  | Saponification degree (mole %) | 95.3 | 97.8 | 98.5 | 93.2 | 87.1 |
| Bending strength (kgf/cm²) |  | 2770 | 2310 | 1900 | 1380 | 1670 |
| Bending modulus (kgf/cm²) |  | 142000 | 109000 | 86000 | 68000 | 64000 |
| Hunter whiteness |  | 91 | 91 | 92 | 90 | 84 |

As apparent from Table 2, mechanical properties lower with increase in ethylene content. Ethylene content is preferably 10 to 55 mole %, more preferably 25 to 45%. Saponification degree in vinyl acetate portion is preferably at least 90 mole %, more preferably at least 95 mole % from the viewpoint of mechanical property and thermal stability (Hunter whiteness).

We claim:

1. A resin composition which consists essentially of 50 to 95% by weight of a saponified ethylene-vinyl acetate copolymer and 5 to 50% by weight of potassium titanate fiber, the saponified copolymer being 10 to 55 mole % in ethylene content and at least 90 mole % in saponification degree of vinyl acetate portion.

2. A resin composition as defined in claim 1 wherein the ethylene content is 25 to 45 mol %.

3. A resin composition as defined in claim 1 wherein the saponification degree of vinyl acetate portion is at least 95 mole %.

4. A resin composition as defined in claim 1 wherein the potassium titanate fiber has an average fiber diameter of up to 2 μm, average fiber length of 5 to 100 μm and a ratio of average fiber length to average fiber diameter (aspect ratio) of 10 to 200.

* * * * *